United States Patent [19]

Holle et al.

[11] 4,195,909

[45] Apr. 1, 1980

[54] SCANNING GRATING FOR A FOCUS DETECTOR

[75] Inventors: Werner Holle, Wetzlar; Walter Bletz, Braunfels, both of Fed. Rep. of Germany

[73] Assignee: Ernst Leitz Wetzlar GmbH, Wetzlar, Fed. Rep. of Germany

[21] Appl. No.: 695,917

[22] Filed: Jun. 14, 1976

[30] Foreign Application Priority Data

Jun. 19, 1975 [DE] Fed. Rep. of Germany ....... 2527223

[51] Int. Cl.² ............................................. G02B 5/18
[52] U.S. Cl. .......................... 350/162 R; 250/237 G; 350/162 SF; 356/125; 356/395
[58] Field of Search ................... 356/169, 125, 4, 395, 356/396; 250/237 G; 350/162 R, 162 SF

[56] References Cited

U.S. PATENT DOCUMENTS

| | | | |
|---|---|---|---|
| 3,344,700 | 10/1967 | Brake | 356/169 |
| 3,586,665 | 6/1971 | Weyrauch | 356/169 X |
| 3,600,588 | 8/1971 | Sayce | 356/169 X |

*Primary Examiner*—Paul A. Sacher
*Assistant Examiner*—John D. Lee
*Attorney, Agent, or Firm*—Gilbert L. Wells

[57] ABSTRACT

An improved scanning grating useful as an image scanner and spatial frequency filter, for a focusing detector to ascertain the focus of an optical system on deflecting the light incident from the optical system into two different directions for forming two images of the exit pupil or of parts thereof of said optical system. A slit grating is superimposed over the groove grating so that the ledges cover the peaks and the troughs thereof. It is thereby attained that the signals obtained from the peak and trough areas, which normally are more or less undefined, are exempt from evaluation. The ledges have a width ranging from 10 to 100 percent of that of the slit width.

4 Claims, 11 Drawing Figures

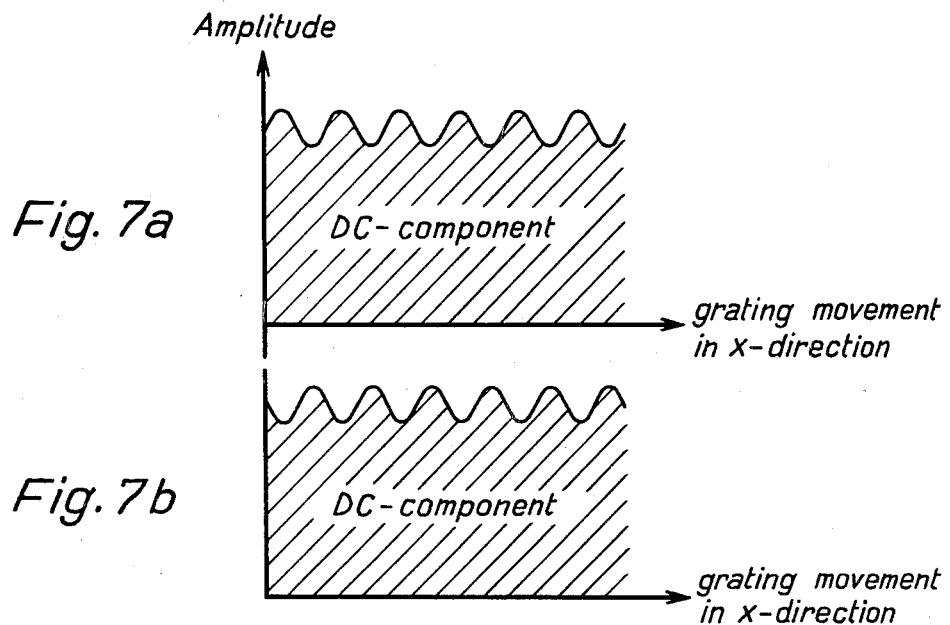
Fig. 7a
Fig. 7b
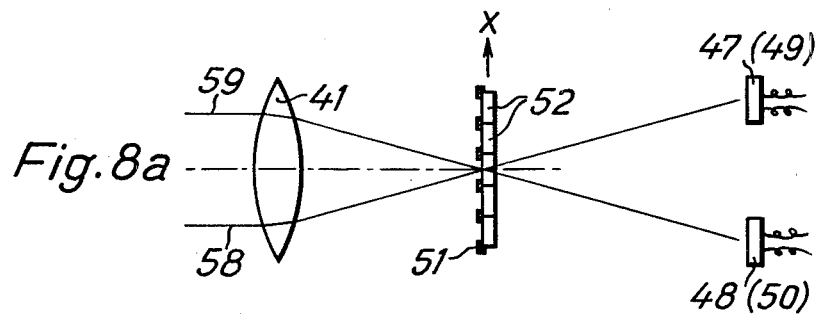
Fig. 8a
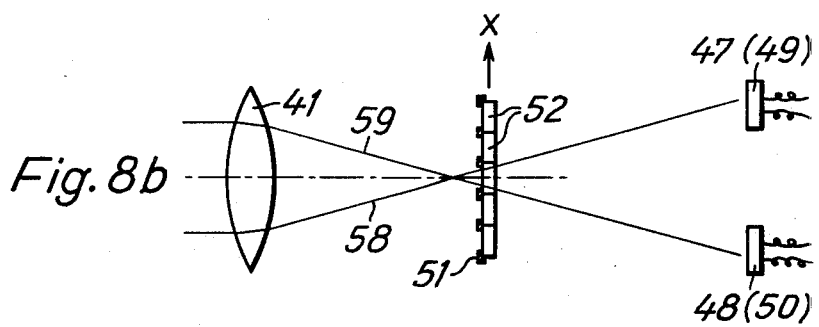
Fig. 8b

SCANNING GRATING FOR A FOCUS DETECTOR

CROSS REFERENCES TO RELATED APPLICATIONS

Applicants claim priority under 35 U.S.C. 119 for Application Ser. No. P 25 27 223.5, filed June 19, 1975 in the Patent Office of the Federal Republic of Germany.

The disclosure of the application of Horst Hartmann, entitled "Method and Apparatus for Automatic Focusing an Optical System with a Scanning Grating" Ser. No. 695,916 and and filed June 14, 1976, is incorporated herein to show the state of the art of focus detectors and the gratings useful therein.

BACKGROUND OF THE INVENTION

The present invention relates to a scanning grating useful as a spatial frequency filter when mounted so as to determine the focusing of an optical system on an object in the image plane of the optical system and being moved relative to the image structure.

Such devices, which are also known as "focus detectors", advantageously make use of a grooved grating as the scanning grating, which in addition to its function as spatial frequency filter also splits up the light beam from the optical system and guides it into two different directions to one light sensitive component each. The electrical signals generated by the latter are applied to a differential amplifier so as to obtain doubling of the signal amplitude with simultaneous suppression of the DC component of the light or of very low spatial frequencies. The state of the art of these detectors and the gratings useful therein may be ascertained by reference to U.S. Pat. No. 3,781,110 the disclosure of which is incorporated herein.

Because of the depths of the grooves (in the direction of the optical axis), of the prior art gratings, they lack a geometrically defined image plane. It is furthermore found that when the aperture region of the optical system is split up as a phase difference for the purpose of representing spatial parallaxes, frequently the signals obtained with displacement of the grooved grating are not identical.

SUMMARY OF THE INVENTION

Having in mind the limitations of the prior art, it is an object of the present invention to provide a scanning grating in which the switching of the aperture ranges takes place in completely regular manner.

This object is achieved by the present invention with an opaque plate having a series of slits comprising intermediary ledges the width of which is from 10 to 100 percent that of the slits followed by deflection means deflecting the light passing through the even numbered slites and that passing through the odd numbered ones into two different directions. This opaque plate is, therefore, a slit grating which functions as an amplitude grating. Hence, it will be referred to hereinafter as the amplitude grating.

While a certain amount of light is lost in this arrangement, on the other hand the signals obtained from different aperture regions are always equal and in phase when focusing takes place in the plane of the amplitude grating. This is therefore a scanning grating for which the focusing plane is given by the amplitude grating and for which the alternating deflection of the light passing through the slits of the amplitude grating is effected by a prismatic grating located to the rear (or in front of) the amplitude grating.

As shown by the illustrative embodiment as shown in the drawings, the loss of light through the amplitude grating is virtually insignificant.

BRIEF DESCRIPTION OF THE DRAWINGS

The present invention is illustrated by, but not limited to, the embodiments shown in the appended drawings, wherein:

FIGS. 7a and 7b show two diagrams of an electric signal generated by one pair of photo-detectors;

FIG. 8a is a schematic top view of the system in focus; and

FIG. 8b is a schematic top view of the system out of focus.

DESCRIPTION OF THE PREFERRED EMBODIMENTS

Figure 1:
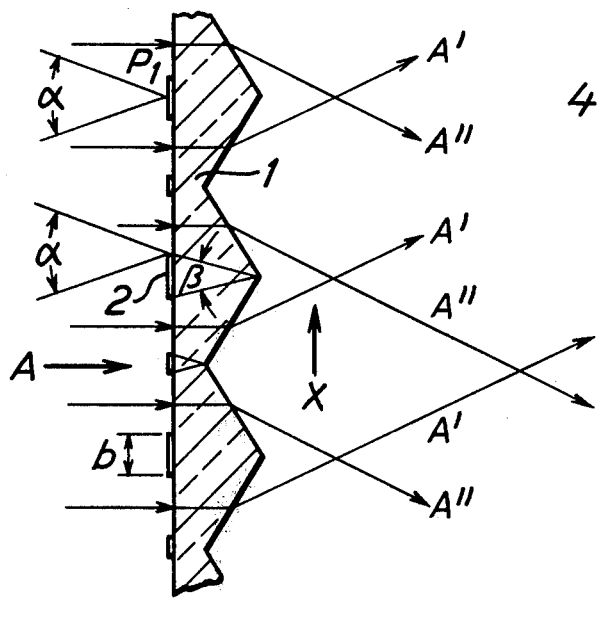
FIG. 1 is a side view in cross section of one embodiment of the present invention in which a grooved grating follows (in the direction of the light) the amplitude grating, and in which the troughs of the grating grooves face the amplitude grating.

A grooved grating shown in cross section is denoted by 1 in FIG. 1. A slit grating 2 is mounted on the plane side of said grooved grating, the ledges of this slit grating being opposite both the peaks and the troughs of the respective grooves. This slit grating 2 represents an amplitude grating as well known in the art and, for example, disclosed in U.S. Pat. No. 3,812,352, issued May 21, 1974 to Alan J. MacGovern. The light incident from the objective comes from the left and moves in the direction of arrow A. By the grooved grating the light flux A is split into two light beams A' and A" travelling in two directions inclined to one another. The two light beams eventually form two separate images of the objective aperture as more clearly described with reference to FIG. 4.

When first image point $P_1$ is considered, which is illuminated from an aperture at an angle $\alpha$, in the absence of the amplitude grating 2, then it is noted that the aperture region is split and that upon moving the grating in the x-direction, switching of all aperture regions do not always take place simultaneously. When on the other hand the amplitude grating is introduced, which is equivalent to covering the peaks and troughs of the grooved grating, some light indeed is lost, but one obtains signals from different aperture regions which are always equal and in phase provided the focus is on the plane of the grating. The embodiment of FIG. 1 requires masking both the groove peaks and troughs, the width of the masks (= ledges) depending on the thickness of the grooved grating, and this thickness cannot be made arbitrarily small.

Figure 2:
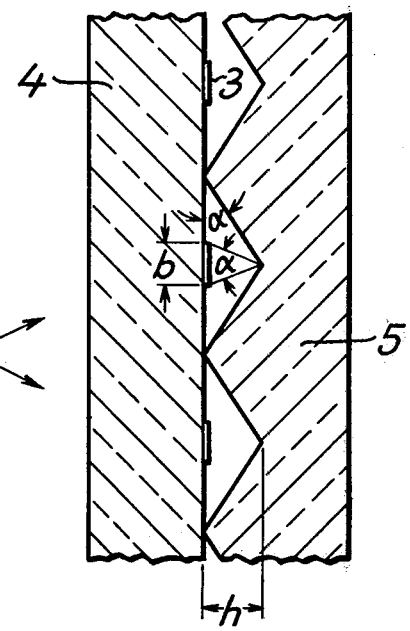
FIG. 2 is a side view in cross section of another embodiment of the present invention in which again the grooved grating follows the amplitude grating in the direction of the light, the amplitude grating however being mounted on a special substrate and the peaks of the grating grooves facing the amplitude grating.

This limitation is avoided in the embodiment of FIG. 2. In this embodiment, the amplitude grating 3 is mounted on a special grating substrate 4 and the peaks of the grooved grating 5 are located in the manner shown, always halfway between two grating ledges, resting on substrate 4.

If the entire aperture angle is denoted by $\alpha$, then $$\tan \alpha = 1/K,$$

where K is the f-stop number. If it is assumed further that the two images of the objective aperture which are produced by the grooved grating and are projected by a field lens (not shown) may touch one another, then the two deflection angles must be at least $+/-1/2\alpha$, and the wedge angles must be at least $\alpha$. Therefore the height h of the grooved grating is given by $$h \geq \tfrac{1}{2} g \cdot \tan \alpha$$

where g is the grating constant. The width b of the grating ledge must be $$b \geq h \cdot \tan \alpha$$

in order to exclude the zone of interference, whereby $$b \geq \tfrac{1}{2} g \cdot \tan^2 \alpha.$$

Thus the masking factor will be $$p = b/g \geq \tfrac{1}{2} \tan^2 \alpha.$$

If for instance, an f-stop number of K = 2 is assumed, the masking factor will be 12.5 percent.

Figure 3A:
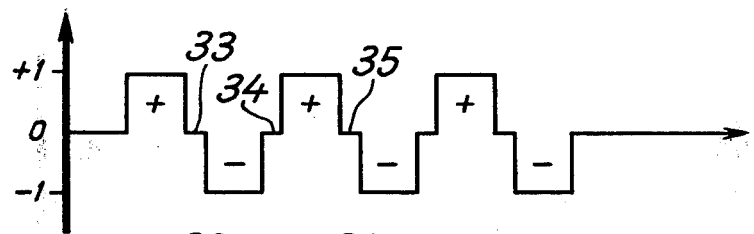
FIG. 3a is a plot of the grating transmission of FIG. 3 in the x-direction.
Figure 3:
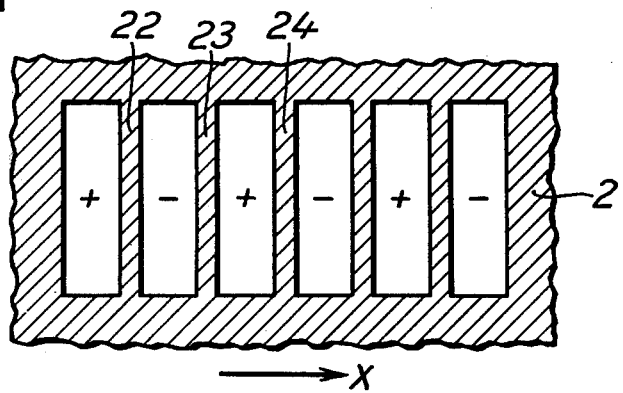
FIG. 3 is a top view of the amplitude grating 2 of FIG. 1.

This masking factor however does not imply that the signal amplitude is decreased by that percentage. This state of affairs is clearly shown in FIGS. 3 and 3a. FIG. 3 represents a top view of the amplitude grating 2 of FIG. 1, and further, FIG. 3a above same, the grating transmission in the x-direction. The negative transmission indicates that the light fluxes passing through every second slit of the grating 2 are processed into electrical signals with inverted signs. The present invention introduces ledges 22, 23, 24 etc. and so achieves square transmission curves with zones 33, 34, 35 etc. of zero transmissivity. It is to be noted that such curves are closer to sines than pure square waves and that the loss in total transmission essentially applies to a decrease in the third harmonic which cannot be used anyway. It is shown that for small widths of the ledges, the fundamental of the spatial frequency filter is attenuated not by the factor p computed above, but by about $1\tfrac{1}{4} p^2$ and for the example cited, this amounts to 2 percent.

The grooved gratings of FIGS. 1 and 2, together with a field lens project two images of the aperture of the objective, these aperture images lying sequentially in the x-direction. However, it is possible also to array these images next to each other in the x-direction, that is, sequentially in the y-direction. This is especially significant when the aperture is made large in the x-direction and when the entrance pupil is other than circular or cannot be of such shape.

Figure 5:
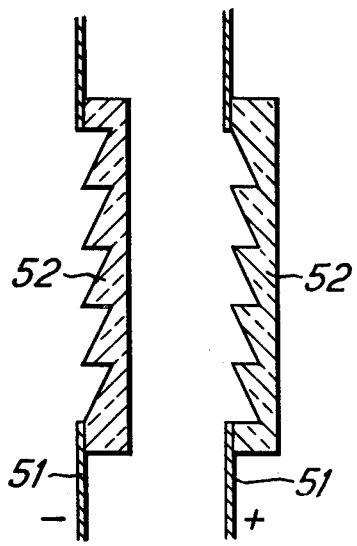
FIG. 5 is a side view in cross section of still another embodiment of the present invention in which sawtooth prismatic strips denoted + and − are associated with the + and − slits of FIG. 3 to insure splitting the light beams into the two pupil images (45, 46) of FIG. 4 in the y-direction.
Figure 6:
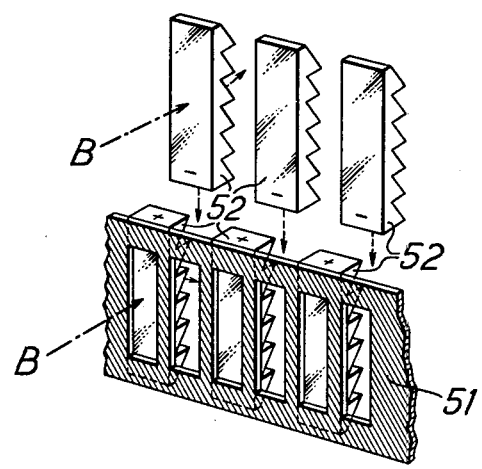
FIG. 6 is a perspective view of an embodiment wherein the prismatic strips shown in FIG. 5 are used.
Figure 4:
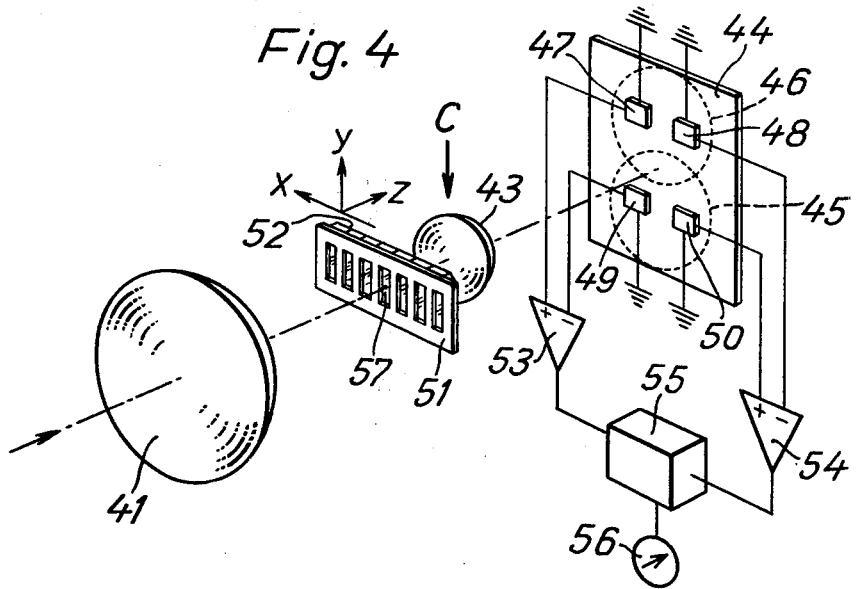
FIG. 4 is a perspective view of an optical arrangement using the scanning grating of the present invention with a split aperture region.

FIG. 4 is a perspective view showing an objective 41 of which the aperture, i.e. the frame of the lens, is imaged onto a detection plane 44 by a field lens 43. In front of the field lens 43 there is arranged a scanning grating x. This scanning grating comprises an amplitude grating 51 of the type described with reference to FIG. 1 and a plurality of saw-tooth prismatic strips 52 as shown in cross section in FIG. 5. While in the embodiment shown in FIG. 1 it was assumed that by the grooved grating 1 two aperture images are formed which are offset from one another in the x-direction, the embodiment of FIG. 4 is such that the aperture images are formed side by side in the y-direction. This is accomplished by the saw-tooth prismatic strips 52 as more clearly shown in FIG. 6.

A plurality of strips 52 denoted as +strips and −strips are shown to be arranged side by side in an alternating order with the ledges of the amplitude grating 51 covering the edges along which the strips are in touch.

From this Figure it will be comprehended that the incident light rays B are deflected by the +strips into a lower y-direction and by the −strips into an upper y-direction so that eventually two images 45, 46 of the objective aperture are formed offset from one another in the y-direction.

A set of two photo-detectors 47, 48 and 49, 50 is disposed on the detection plane in each aperture image, with each detector of each set covering a different image area.

FIG. 4 further shows the electric circuit of which the photo-detectors 47, 48 and 49, 50 are component parts. This circuit comprises a first differential amplifier 53 and a second differential amplifier 54, a phase evaluator 55 and an indicating meter 56. The photo-detectors 47 and 49 are connected to the amplifier 53 and the photo-detectors 48 and 50 are connected to the amplifier 54. The differential amplifiers function in such a way that they form the difference of the supplied signals and carry this difference at their output.

The forming of two images of the objective aperture on the detection plane 44 and placing one photo-detector —for example the detectors 47 and 49—in either image serves to generate signals in said two detectors which are out of phase by 180°. This will best be understood if it is assumed that a given object point is imaged on the slit 57. If, now, the subsequently arranged saw-tooth strip is a minus strip the light rays imaging this object point in the plane of the amplitude grating 51 are deflected in an upward direction and are incident on the photo-detector 47 there causing an electric signal. At the same time no light rays fall on the photo-detector 49 (from this given object point) so that this given point generates no signal on the photo-detector 49.

If, however, the scanning grating now undergoes its scanning movement in the x-direction the image of the given object point falls on a slit adjacent to the slit 57 and, consequently, the light rays are deflected in a downward direction so that they are incident on the photo-detector 49 generating the electric signal on this detector, while the photo-detector 47 does not receive light (from this given object point) and carries no signal.

From the foregoing it will be comprehended that generally the signals generated by the two photo-detectors 47 and 49—as well as by the photo-detectors 48 and 50—are offset in phase from one another by 180°.

In addition it must be understood that the signals which show a sine configuration are not obtained from the photo-detectors in a pure form but as a modulation on top of a large D.C. component which results from stray light (FIG. 7a, 7b). Since the signals are phase-shifted by 180° one signal may be denoted +signal and the other the —signal. When both signals are fed to the differential amplifier the —signal is subtracted from the +signal. This substraction has the double effect that the signal itself is doubled in amplitude while the D.C. component is reduced to zero. This method is known as the "split aperture method" or "split pupil method" and is also disclosed, for example in U.S. Pat. No. 3,856,401 and, to a certain degree, in U.S. Pat. No. 2,527,896. It is not the object of the present invention.

However, this method is applied only for obtaining clear and processable signals that may be readily evaluated. It has nothing to do with the focus detection proper. Whether the optical system is in focus or not is rather detected by comparing the phase of the two signals obtained by the split aperture method, i.e. by comparing the phase of the signals carried by the output terminals of the amplifiers 53 and 54. These signals are supplied to the phase evaluator 55 and from the indicating meter 56 it may be read whether the signals are in phase or not, which is equal to whether the system is focused or not.

From the FIGS 8a and 8b it will be understood why the phasee relation of the two signals provides an information on the focussing state of the system. The Figures are a schematic top view in the direction of arrow C (FIG. 4) of the device shown in FIG. 4, however, with the field lens 43 being omitted for sake of simplicity. FIG. 8a shows the system in focus, i.e. the parallel light rays 58 and 59 from an object are properly focussed on the plane of the amplitude grating 51. Behind the grating the light ray 58 travles to the photo-detector 47 while the light ray 59 travels to the photo-detector 48. If now in the course of its scanning movement the grating 51 (together with the strips 52) moves in the x-direction it will readily be seen that both light rays are blocked simultaneously which means that the light incident on the photo-detectors 47 and 48 becomes dimmer at the same time, which in turn means that the amplitude of either electric signal generated by either photo-detector becomes lower at exactly the same moment: The signals are in phase.

From FIG. 8b it will be comprehended that when the object is not focussed on the plane of the amplitude grating and the grating executes its scanning movement for example in the x-direction of the arrow, that then first the light ray 59 is cut off by the grating so that the light intensity on the photo-detector 48 is gradually reduced which also reduces the amplitude of the signal generated by the detector 48. This occurs at a time when the light ray 58 is still fully incident on the photo-detector 47 so that the signal generated by this detector still has its greatest amplitude. This all results ina phase shift between the two electric signals generated by the two photo-detectors. From this plane shift it may be concluded that the system is out of focus. The degree of the phase difference provides an information on how far the system is out of focus, and, judging from which signal is first reduced in amplitude and which one is lagging, it may also be discerned in what direction the objective has to be moved in order to achieve a proper focussing.

It should, however, be borne in mind that neither the "split aperture method" described above nor the focusing method is an object of the invention. The object of the present invention is merely to obtain clear signals especially in the transition areas and this object is attained by combining an amplitude grating with a grooved grating or with the saw-tooth strips.

We claim:

1. A scanning grating having light passing therethrough along an optical axis, comprising:
    (a) an opaque pane having a series of slits with intermediary ledges, said ledges having widths ranging from about 10 to 100% of the widths of said slits; and
    (b) means behind said ledges located along said optical axis and mounted on said ledges for deflecting said light passing through even numbered slits in a first direction and deflecting said light passing through odd numbered slits in a second direction, said deflected light intersecting at given points and said ledges being located opposite said given points.

2. The scanning grating as defined by claim 1, wherein the widths of said ledges (2) vary.

3. The scanning gratings as defined in claim 1, wherein said gratings are provided with further dark areas for decreasing the proportion of harmonics in the signal.

4. A scanning grating having light passing therethrough along an optical axis, comprising:
    (a) an opaque pane having a series of slits with intermediary ledges, said ledges having widths ranging from about 10 to 100% of the widths of said slits; and
    (b) a grooved grating having peaks and troughs behind said ledges located along said optical axis and mounted on said ledges, said ledges located opposite said peaks and troughs.

* * * * *